Patented Feb. 24, 1931

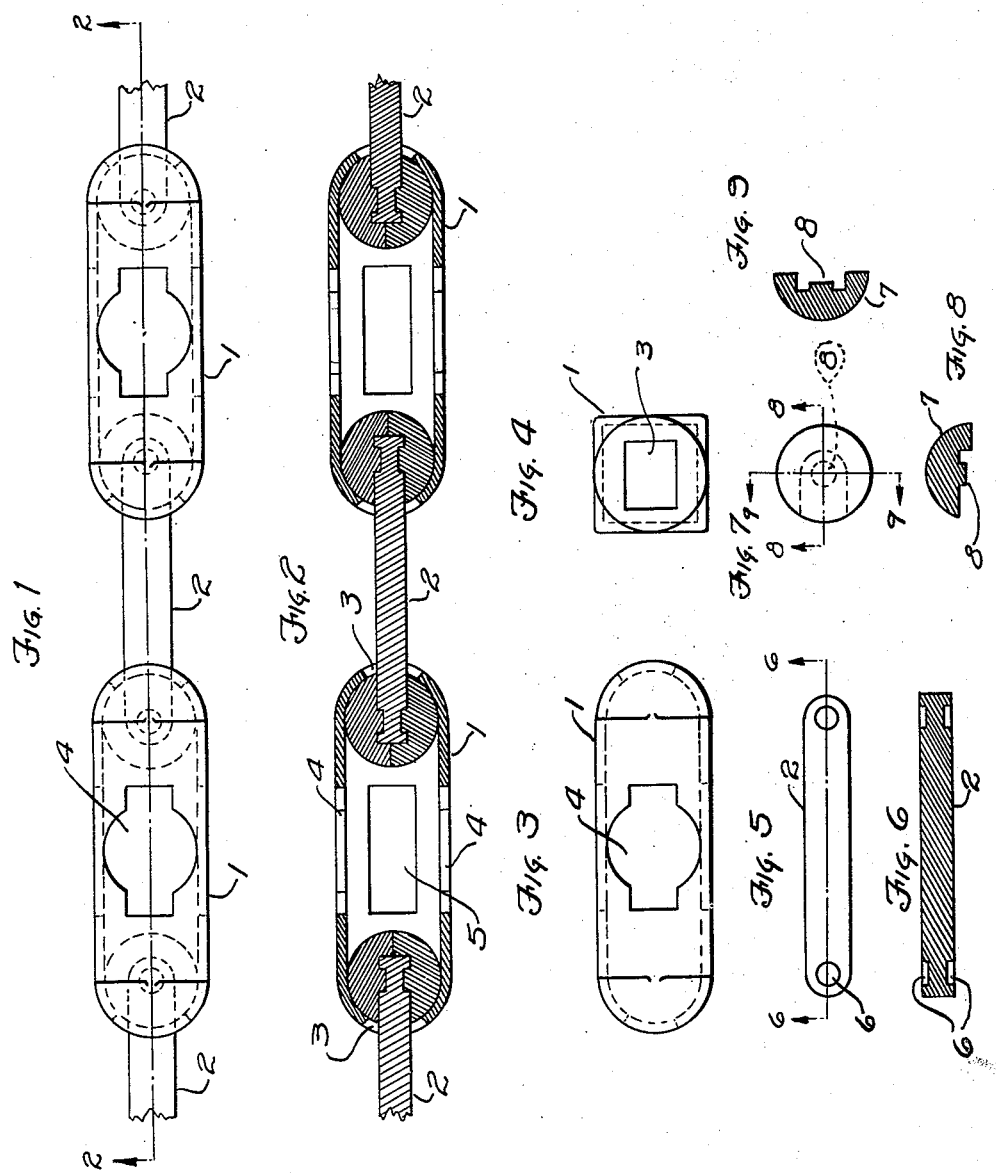

1,793,452

UNITED STATES PATENT OFFICE

JAMES D. AUSTIN, OF TOLEDO, AND CLARENCE W. AUSTIN, OF CANTON, OHIO, ASSIGNORS OF ONE-FOURTH TO WILLIAM ISLER, OF CANTON, OHIO

CHAIN

Application filed December 31, 1927. Serial No. 243,984.

This invention relates to new and useful improvements in chains, such as are ordinarily used in connection with sprockets on a great many different classes of machinery for transmitting power.

An object of the invention is to provide a chain, the sprocket links and the connecting links of which, are readily and easily detachable from each other, and in which a broken sprocket link or connecting link can be quickly replaced without material loss of time.

Another object of the invention is to provide a chain, the sprocket links of which are so connected to each other, as to permit them to have a wide range of movement about their own longitudinal axes, a condition which not only reduces breakage of links to a minimum, but which at the same time imparts considerable flexibility to the chain as a whole. This flexibility is not obtainable with the ordinary type of roller chain, the link-belt, or the quick detachable type of chain, and is such as to permit the chain as a whole to be driven in a plane at an angle to its ordinary movement in a single plane. This adaptability of the chain as a whole to move at an angle to its ordinary movement in a single plane is especially useful in connection with the driving of various types of conveyors, such as are used extensively in automobile assembly plants.

These and other objects of the invention will become more readily apparent in the course of the following description of the invention, taken in connection with the accompanying drawing wherein Fig. 1 is a side view showing two sprocket links of the chain and one of the connecting links;

Fig. 2 is a cross-section through the chain, taken on the line 2—2 of Fig. 1;

Fig. 3 is a side view of one of the sprocket links of the chain;

Fig. 4 is an end view of one of the sprocket links of the chain;

Fig. 5 is a side view of one of the connecting links of the chain;

Fig. 6 is a cross-section through one of the connecting links, taken on the line 6—6 of Fig. 5;

Fig. 7 is a side view of one of the swivel clamp members which serves to connect the sprocket links with the connecting links;

Fig. 8 is a cross-section through the swivel clamp member, taken on the line 8—8 of Fig. 7;

Fig. 9 is a cross-section through the swivel clamp member, taken on the line 9—9 of Fig. 7.

Referring more particularly to the drawings, the chain comprises a series of sprocket links 1, connected to each other by means of connecting links 2.

Intermediate their ends, the sprocket links are in the form of hollow rectangular parallelopipeds, approximately square in outside and inside cross-section, as clearly shown in Fig. 4, and the ends of the links are approximately in the shape of hollow hemispheres, having rectangular openings 3 therein, to permit the passage of the connecting links 2 therethrough. The sprocket links are further provided with side openings 4 of the contour shown in Fig. 1, and top and bottom openings 5, which are adapted to receive the teeth of a sprocket (not shown).

The connecting links are rectangular in cross-section and are provided near their ends with circular depressions or recesses 6, which serve a purpose to be presently disclosed.

Swivel clamp members 7 are employed in pairs to connect the sprocket links with the connecting links, and each of said members has formed thereon, a circular projection 8, which is adapted to seat in the circular depression or recess 6 of the connecting links when the various parts are assembled in making the chain.

The various parts of the chain are assembled in the following manner:

Complementary swivel clamp members 7 are inserted through the side openings 4 of the sprocket links, and are caused to clamp over one of the ends of a previously inserted connecting link 2. The parts thus assembled are then pulled to the end of the sprocket link, and the connecting link at the opposite end of the sprocket link is connected thereto in a similar manner. When fully assembled, the various parts occupy the position shown in Fig. 2.

It should be noted that the inner face of the hollow hemispherical ends of the sprocket links act as wedge-like surfaces to clamp together the swivel clamp members and thereby effectually prevent the sprocket and connecting links from separating from each other.

The inner surfaces of the hollow hemispherical ends of the sprocket links and the hemispherical shape of the swivel clamp members permits a restricted universal movement between the sprocket links and the connecting links, and the flexibility of the chain as a whole is attributed to this feature of the invention.

Claims:

1. A sprocket link for a chain comprising a member having hollow hemispherical ends, and an intermediate portion in the form of a hollow rectangular parallelopiped.

2. A sprocket link for a chain comprising a member having hollow hemispherical ends and an intermediate portion in the form of a hollow rectangular parallelopiped, said ends having openings therein, and said intermediate portion being provided with openings in the sides thereof.

3. A chain comprising hollow sprocket links provided with openings in the side and end walls thereof, connecting links insertable through the openings in the end walls of the sprocket links, and coacting clamp members insertable through the openings in the side walls of the sprocket links and serving to unite said connecting links and sprocket links.

4. A chain comprising hollow sprocket links provided with openings in the side and end walls thereof, connecting links insertable through the openings in the end walls of the sprocket links, and coacting hemispherical clamp members insertable through the openings in the side walls of the sprocket links and serving to unite said connecting links and sprocket links.

5. A chain comprising a series of hollow sprocket links, each provided with openings in the end walls thereof and in the walls connecting the end walls; connecting links having ends projecting through the openings in the end walls of adjacent sprocket links, and clamp members insertable through the openings in the walls connecting the end walls of the sprocket links and serving to engage the ends of the connecting links.

6. A chain comprising a series of hollow sprocket links, each provided with openings in the end walls thereof and in the walls connecting the end walls; connecting links having ends projecting through the openings in the end walls of adjacent sprocket links, and hemispherical clamp members insertable through the openings in the walls connecting the end walls of the sprocket links and serving to engage the ends of the connecting links.

7. A sprocket link for a chain comprising a member having hollow hemispherical ends and an intermediate portion provided with openings in the sides thereof.

8. A sprocket link for a chain comprising a hollow member provided with end walls and side walls connecting the end walls, the end walls being provided with openings for the reception of the ends of connecting links, and the side walls being provided with openings for the reception of connecting link clamp members.

9. A sprocket link for a chain comprising a hollow member provided with end walls and side walls connecting the end walls, the end walls being provided with openings for the reception of the ends of connecting links, and the side walls being provided with a plurality of openings, certain of which are adapted to receive connecting link clamp members, and all of which are adapted to receive sprocket teeth.

In testimony whereof we affix our signatures.

JAMES D. AUSTIN.
CLARENCE W. AUSTIN.